US008876295B2

(12) United States Patent
Scanlon (10) Patent No.: US 8,876,295 B2
(45) Date of Patent: Nov. 4, 2014

(54) METHOD FOR DISPLAYING IMAGES AND/OR OTHER INFORMATION ON AIRCRAFT BLADES

(75) Inventor: Michael V. Scanlon, Laurel, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 297 days.

(21) Appl. No.: 13/407,838

(22) Filed: Feb. 29, 2012

(65) Prior Publication Data

US 2012/0212712 A1 Aug. 23, 2012

Related U.S. Application Data

(63) Continuation-in-part of application No. 12/243,436, filed on Oct. 1, 2008, now Pat. No. 8,157,383.

(51) Int. Cl.
*G03B 21/00* (2006.01)
*G06F 3/038* (2013.01)
*G03B 21/56* (2006.01)

(52) U.S. Cl.
CPC .................................. *G03B 21/562* (2013.01)
USPC .............. 353/13; 353/122; 345/204; 359/446

(58) Field of Classification Search
USPC ..................... 353/13, 122; 345/204; 359/446; 348/658
See application file for complete search history.

(56) References Cited

U.S. PATENT DOCUMENTS

| 1,999,479 | A | * | 4/1935 | Reder | 353/13 |
| 6,193,384 | B1 | * | 2/2001 | Stein | 362/96 |
| 7,740,359 | B2 | * | 6/2010 | Schnuckle et al. | 353/79 |

FOREIGN PATENT DOCUMENTS

TW 201113678 A * 4/2011 ................ G06F 1/20

* cited by examiner

*Primary Examiner* — Georgia Y Epps
*Assistant Examiner* — Magda Cruz
(74) *Attorney, Agent, or Firm* — Lawrence E. Anderson (57) ABSTRACT

A method for displaying information via a light source on rotating helicopter blades of an aircraft such as a helicopter is provided. The light source may be a laser light source and the light therefrom may be directed onto the aircraft blade by one or more motion controlled mirrors and a computer controller. A sensor is capable of determining the position of helicopter blades during rotation, such that light may be projected upon only the moving blade at precisely timed intervals, so as to form perceivable graphics and/or messages thereon. In addition, the method may be utilized for displaying graphics and/or messages on rotating propellers of fixed wing aircraft.

20 Claims, 10 Drawing Sheets

METHOD FOR DISPLAYING IMAGES AND/OR OTHER INFORMATION ON AIRCRAFT BLADES

The present invention is a continuation-in-part and claims priority to U.S. Application Ser. No. 12/243,436 entitled "SYSTEM FOR DISPLAYING IMAGES AND/OR INFORMATION ON AIRCRAFT BLADES AND METHOD THEREOF" filed Oct. 1, 2008 now U.S. Pat. No. 8,157,383, by Michael V. Scanlon.

STATEMENT OF GOVERNMENT INTEREST

The invention described herein may be manufactured, used, imported, sold, and licensed by or for the Government of the United States of America without the payment of any royalty thereon or therefore

FIELD OF THE INVENTION

The present invention provides a system for displaying information on the underside of rotating blades via lasers. In particular, a system is provided, comprised of a light source(s) for illumination of at least one rotating blade by a computer controller, which is capable of determining the position of the rotating blade during rotation, and displaying laser light upon the moving blade at precisely timed intervals, so as to form perceivable graphics and/or messages thereon. In addition, such a system is provided for displaying graphics and/or messages on the external surfaces of marine vessels, aircraft, etc.

BACKGROUND OF THE INVENTION

The display of messages and indicia on a fan is disclosed in U.S. Pat. No. 7,161,256 to Fang, hereby incorporated by reference as though fully rewritten herein. The '265 patent discloses light-emitting elements mounted directly on a fan that can be controlled to generate various different twinkling light-image variations, utilizing the effect of persistence of vision when the fan motor is rotating. U.S. Pat. No. 6,480,116 to Wang, hereby incorporated by reference as though fully rewritten herein, discloses a "Method and Apparatus for Showing Special Characters or Figures on a Rotating Disk." The '116 patent discloses illuminating a rotating disk in a manner such that the rotational cycle of the disk is analyzed and different light fittings on the rotating disk light up at various time delays dependent in part upon the persistency of vision of the human eye, thereby displaying figures or special characters. The terminology "persistency of the human eye" relates to the principle that when a bright image is viewed by the human eye, the brain will perceive the image still to be there for a short time after it has been removed. U.S. Pat. No. 6,175,354 to Bissett discloses an "Image Display Apparatus," wherein LEDs positioned on fan blades are selectively energized. The '354 patent further discloses a counter and a microcontroller which measure the time the fan blades take to complete a full cycle of rotation, calculate a delay time when no image is displayed, and selectively energize the LEDs according to a pattern or digitized image stored in memory. U.S. Pat. No. 6,213,617 to Barker, hereby incorporated by reference as though fully rewritten herein, discloses the illumination of a fan by strobe lights positioned at substantially equal spaced apart distances around the central body portion of the fan assembly to project light onto the fan blades. An electric eye emitter and sensor detect the fan blade location in order to determine the angular rotation and position of the fan blades in order to synchronize the operation of the strobe lights with the fan blades. U.S. Pat. No. 7,179,149 to Chernick discloses a novelty lighting device that spins in a variety of circular pathways with a control circuit that selectively flashes the lights in an array in a manner that is synchronized to the speed of the various lights in their circular pathways.

Lasers have been utilized to measure the velocities and blade attitude of a helicopter blade in wind tunnels as disclosed in the article entitled "2D Laser Velocimetry Near Helicopter Blades in DNW (NLR)," by Boutier, et al, Instrumentation in Aerospace Simulation Facilities, 1993. ICIASF '93 Record, International Congress on Sep. 20-23, 1993 Page(s) 32 1-328, hereby incorporated by reference as though, rewritten herein. The Boutier article describes tests achieved at DNW (windtunnel of NLR) on a helicopter in forward flight conditions for the purposes of recording the components of the velocity vector in a 2D vertical frame around the blade, and simultaneously measuring the position of the 2 m long blade rotating at a speed of 1050 rpm. Two series of measurements were performed: the first one in a closed test section (8 m×10 m) with a working distance of 2.7 m, the second one in an open test section for which this working distance was increased up to 5 m. The Boutier article describes the optical and mechanical set-up, the synchronization of the measurements and the blade attitude measurement technique and presents results of the determination a the velocity field around helicopter blades in forward flight conditions with the attitude of the blade extremity being simultaneously recorded on the same computer.

The blades of a helicopter are somewhat unique in terms of the aerodynamics of the fuselage and blades. Helicopters experience unique forces when in flight, and the blades are designed to overcome and/or compensate for such forces. As a helicopter moves forward, the tip speed changes as the blades rotate around the fuselage. An increase in tip speed occurs when the blade advances toward the nose in the direction of flight, since the velocity of the helicopter adds speed to the velocity of the tip. As the tip begins retreating past the helicopter, the tip speed decreases inasmuch as the speed of the helicopter is subtracted from the tin speed. Because lift increases with airflow speed, the advancing blade produces more lift than the retreating blade, resulting in the need to make adjustments to prevent roll over.

To compensate for the unbalanced lift the blades are flexible, or articulated. Each main rotor blade is connected to the shaft by a flexible hinge, allowing the rotor blades to rise and fall slightly as they rotate, resulting in flapping. The retreating blade, creating less lift, naturally flaps down so as to increase lift. Flapping allows the differences in lift caused by uneven rotor tip speed to cancel out, producing a stable ride. In addition, during the operation of the helicopter, the pilot will change the angle or pitch of the blades in order to maneuver the helicopter. In general, a collective pitch stick or lever allows the helicopter to climb and descend vertically by changing the pitch of all the main rotor blades equally. Pulling or pushing on the lever increases or decreases the thrust produced, varying the lift.

Helicopters are adapted to be used for various missions, including search and rescue, traffic observation and reporting and military operations involving delivery and retrieval of personnel. During such missions, communication between ground-based personnel and helicopter crews is essential. For example, rescue helicopters rescuing below, when speaker projection systems may be insufficient in producing sufficient signal to noise ratios to overcome the helicopter and surf noise In traffic reporting applications, helicopters may need to communicate directly with ground-based people not in possession of a radio, or to communicate directional information difficult to express orally.

In certain military operations, it is desired to deliver military personnel to covert or dangerous locations. To achieve covert insertions, or to deliver personnel quickly, conventional operations often involve delivery of personnel to the ground via ropes extending from the helicopter to the ground, obviating the need landing the helicopter. However, soldiers that fast-rope from a helicopter are often disoriented during the insertion process, and unable to determine the proper direction of travel on reaching ground. Although radio communication is sometime used to assist the ground personnel, radios are not issued to every ground soldier, and often the communication between aircraft and ground crew is difficult due to environment and operational distractions.

In view of the difficulties of communication conventionally encountered between in-flight helicopters and ground-based personnel, it is an object of the present invention to provide a system and method to enable visual communication between helicopter crews and ground-based personnel. In particular, it is an object of the present invention to provide a system capable of projecting images and/or messages via a laser light source on the underside of rotating helicopter blades. These messages or icons can also represent geospatial references relative to the helicopter, or some ground way point.

SUMMARY OF THE INVENTION

In order to achieve the objects of the present invention, the present inventor earnestly endeavored to develop a system capable of displaying images upon the rotating blades of an aircraft via a light source, the meaning of which, when viewed by the human eye from below, can be understood. In particular, in a first embodiment of the present invention, a system for projecting information and/or displays via lasers on rotating helicopter blades of a helicopter is provided comprising a controller and/or central processing unit (CPU), one or more light sources operatively connected to the controller or CPU, a sensor for sensing the position of the aircraft blade or blades, and light positioning or directing apparatus for positioning or directing light onto a specific location on the aircraft blade or blades for a specified time, whereby light illuminates portions of the helicopter blade or blades at time-intervals precisely timed to form images and/or display information thereon. Alternatively, a microprocessor or microcontroller may be utilized instead of or in conjunction with the controller and/or CPU. A power source operatively connected to the controller and/or CPU. In at least one embodiment at least one mirror is used to direct the light from the light source onto a specific portion or portions of the helicopter blade. Alternatively, any methodology for focusing and/or directing light may be utilized in place of or in conjunction with a mirror, or mirrors.

The controller or CPU may be operatively connected to a sensor that is capable of calculating the location of the blade or blades. This enables the controller or CPU to correctly time projections for each incremental sequence of points projected onto the underside of the helicopter blades, so as to sequentially form a character or image. By doing so, each successive position of the blade will receive the next appropriate sequence of dots or line segments, to form a complete image that is updated numerous tires per second as the blade spins through a section. Each blade portion or section may be updated at the rate of the spinning blade.

If there are no restrictions on projecting laser light upwards past the spinning blades, this invention is simplified by not restricting light or laser emissions to only illuminating the blades and the laser light can be projected into the air beyond the blades, minimizing or eliminating the need to pulse the laser light source in synchronism with the blade(s). Thus, the laser light could be projected between the blade(s) onto the clouds or smoke above the helicopter, or into the open air.

In a second embodiment of the present invention, the system for projecting light onto the rotating helicopter blade(s) of the first embodiment above is provided, wherein the light source is a visible laser light source or IR laser light source or a laser light source outside of the visible light spectrum.

In a third embodiment of the present invention, the system for projecting information or an image(s) on rotating helicopter blade(s) of the first embodiment above is provided, wherein the sensing means is comprised of one or more of a passive infrared sensor, acoustic sensor, ultrasonic sensor, magnetic sensor, RF sensor, and/or an electrical field sensor.

In a fourth, embodiment of the present invention, the system for projecting information or an image(s) on rotating helicopter blade(s) of the first embodiment above is provided, wherein the sensing means comprises one or more of encoders, resolvers and/or hall-effect transducers, and/or one or more directional passive IR sensors, or one or more of acoustic and/or flow sensors.

In an fifth embodiment of the present invention, the system for projecting information or image(s) on rotating helicopter blade(s) comprises software or hardware which synchronizes the light source with a blade position sensor so that light is emitted from the light source in a direction and at a time corresponding to the position of the rotor blades of the helicopter.

In a sixth embodiment of the present invention, the system for projecting information or image(s) on rotating helicopter blade(s) of the first embodiment above is provided, wherein the sensor or sensors are operatively coupled to the helicopter's shaft, transmission or drive train; the sensors operable to detect a position of a particular component in the drive train, and wherein the controller or CPU is operable to correlate the position of the particular component to the helicopter blade position.

In a seventh embodiment of the present invention, the system for projecting information or image(s) on rotating helicopter blade(s) of the first embodiment above is provided, wherein the controller or CPU is further operatively connected to the helicopter's navigation and guidance system or where the controller or CPU is incorporated into the operating system of the helicopter.

In a eighth embodiment of the present invention, the system for projecting information or image(s) on rotating helicopter blade(s) of the first embodiment above is provided, further comprising a mechanical blanking or shuttering apparatus operatively connected to the controller or CPU, which is operable to disrupt transmission of light from the one or more light sources in synchronism with the regions between the helicopter blade(s).

In a ninth embodiment of the present invention, the system for projecting information or image(s) on rotating helicopter blade(s) further comprises a synchronizing apparatus operatively connected to the controller or CPU and the mechanical shuttering apparatus.

In a tenth embodiment of the present invention, the system for projecting information or image(s) on rotating helicopter blade(s) further comprising a sensor operatively connected to the helicopter's transmission or drive train and the blanking shuttering apparatus; wherein said synchronizing apparatus is operable to maintain the blanking or shuttering apparatus in proper phase with blade rotation.

In a eleventh embodiment of the present invention, the system for projecting information or image(s) on rotating helicopter blade(s) further comprises one or more reflectors disposed on one or more of the helicopter blades; wherein said reflectors are capable of reflecting back light for detection by electro-optical, radar, acoustic, or electromagnetic apparatus, in a manner well known to those of ordinary skill in the art.

In addition, the embodiments of the present invention for projecting information or image(s) on rotating blade(s) may be utilized in connection with a fixed wing propeller aircraft in a disposition capable of projecting images upon the rotating propeller.

DETAILED DESCRIPTION OF THE INVENTION

Figure 1:
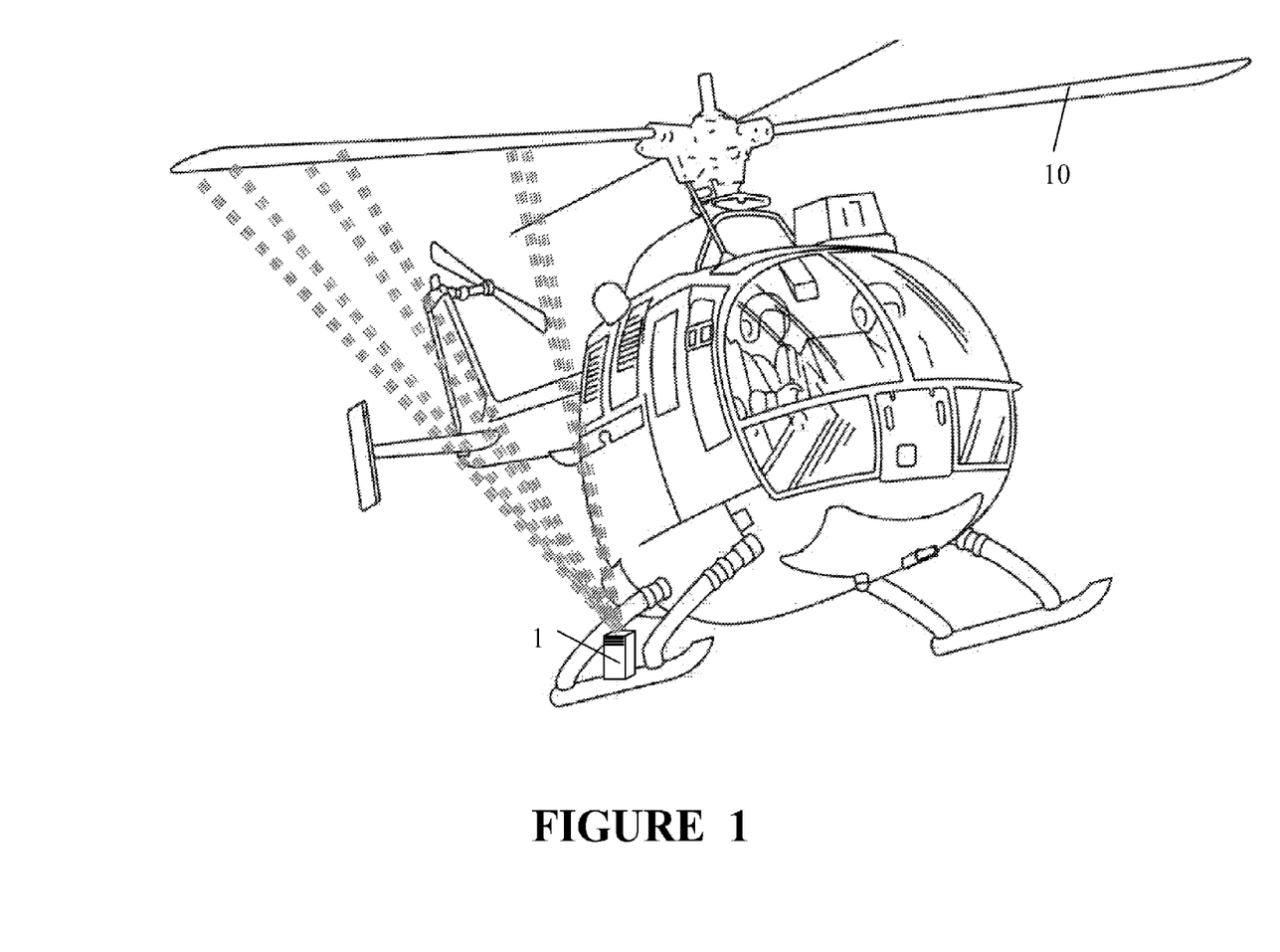
FIG. 1 is an illustration of a helicopter showing an instantaneous snapshot of numerous laser lines projected from a light source onto the underside of one blade section during rotation of the blades, to form a message or graphic viewable from below.
Figure 3:
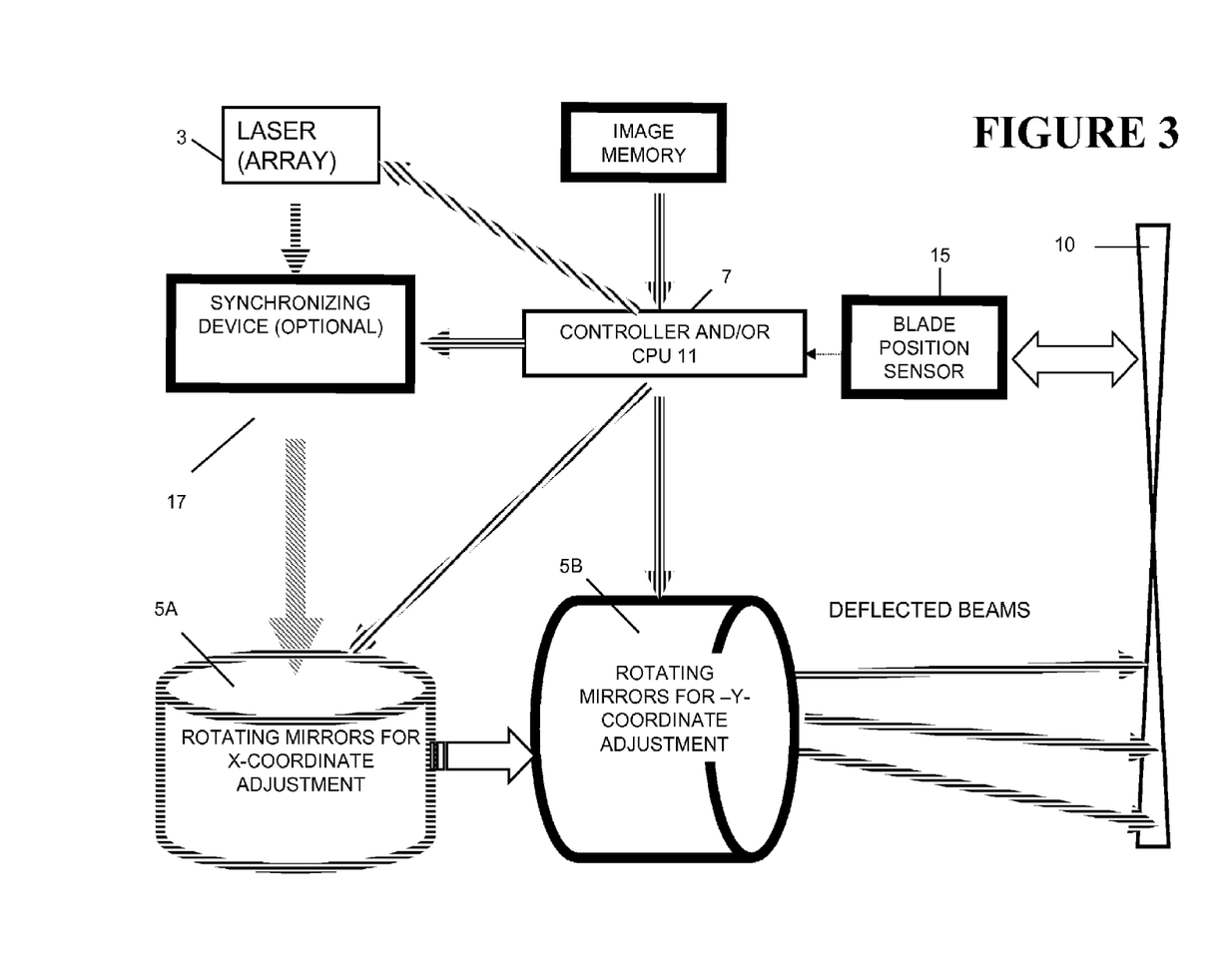
FIG. 3 is a block diagram of the light projection system.

As illustrated in FIGS. 1 and 3, the present invention provides a system capable of projecting laser-images on the underside of the helicopter rotor, and a method comprising same. In practice, a laser image is projected onto a helicopter's rotor, which may comprise one or more blades 10. As the blades spin, due to "persistency of the human eye," the human brain will perceive the image still to be there for a short time after blade has moved. The human eye spatially and temporally scans the laser images that are being projected onto the moving blades, resulting in a full image retention or visualization.

As shown in FIG. 3, the position of the blade 10 is sensed by the blade position sensor 21 which transmits a signal to the synchronizing device 17. Light passing from the laser array is synchronized by the synchronizing device 17 operatively connected to the blade position sensor so that light will be emitted during a specific time interval. The image to be projected is stored in memory. The invention may be carried out with software; hardware or a combination of both. The memory may store a grid, bit map, or digitized image having X and Y or radial and angular, coordinates for each point to be projected for the desired display. The digital image file format may be a bitmap or pixmap or other spatially mapped array of bits. For example, U.S. Pat. No. 7,161,256, hereby incorporated by reference, discloses an automatic power generation light image device comprising a sensor 8 and pattern memory 45 operatively connected to an array of light emitting elements mounted directly on the rotating blades which are illuminated at a frequency associated with the lasting light image retained in the human brain. The image may be stationary or animated, and may contain pictorial or graphical elements. It can be readily appreciated by those of ordinary skill in the art that by mounting the light emitting elements directly on the blades, the need for the external light source and mirrors is eliminated.

In accordance with the present invention, as the blade 10 rotates, the digital signals correlating to rotational cycle for the blade 10 are fed into the controller 7. The desired figure or image, is inputted from memory into the controller 7. The controller 7 converts the image data into signal data and time delay signal data. Signals from the controller 7 to the laser 3, synchronizer 17 and X and Y coordinate rotating mirror assemblies 5A and 5B operate to produce light from the light source 3 at the appropriate time and intensity. The light source 3 may be for example a laser or laser array comprising various colored lasers and/or intensities, and may be stationary or movable in a manner well known to those of ordinary skill in the art. An example of an image projection technique is disclosed in U.S. Pat. No. 6,380,116, hereby incorporated by reference.

By only transmitting laser pulses at the correct time and coordinate (or bit map) position onto the blades, the system of the present invention creates a pulsating composite image that is persistent with time through integration by the naked eye, and is visible when sampled at some regular interval by electro-optic sensors or imagers. Further, the system of the present invention may be operated to only emit laser light upon the blade surfaces, and not into the open air therebetween.

Figure 2A:
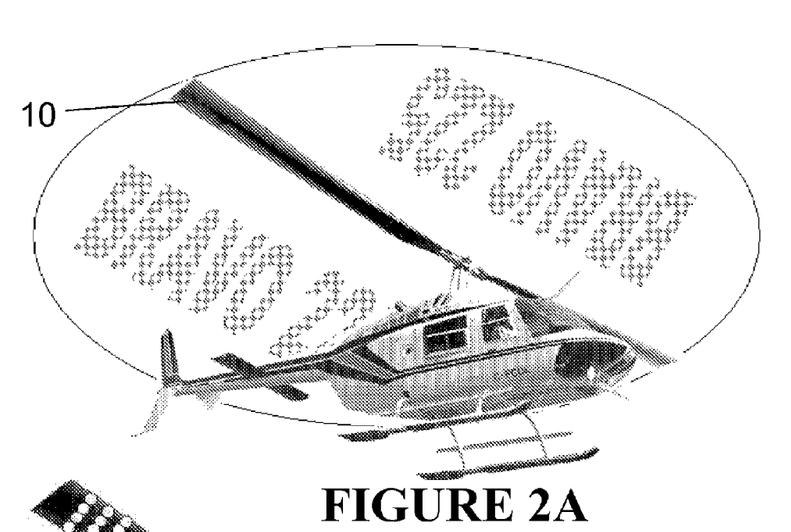
FIG. 2A is an illustration of a helicopter utilizing the system of the present invention to project laser lines onto the underside of two sections of the rotating helicopter blades during flight, thus forming two messages thereon. The projection shown in FIG. 2A may be accomplished using one system to project the two images, or in the alternative, two or more, systems could be utilized.
Figure 2B:
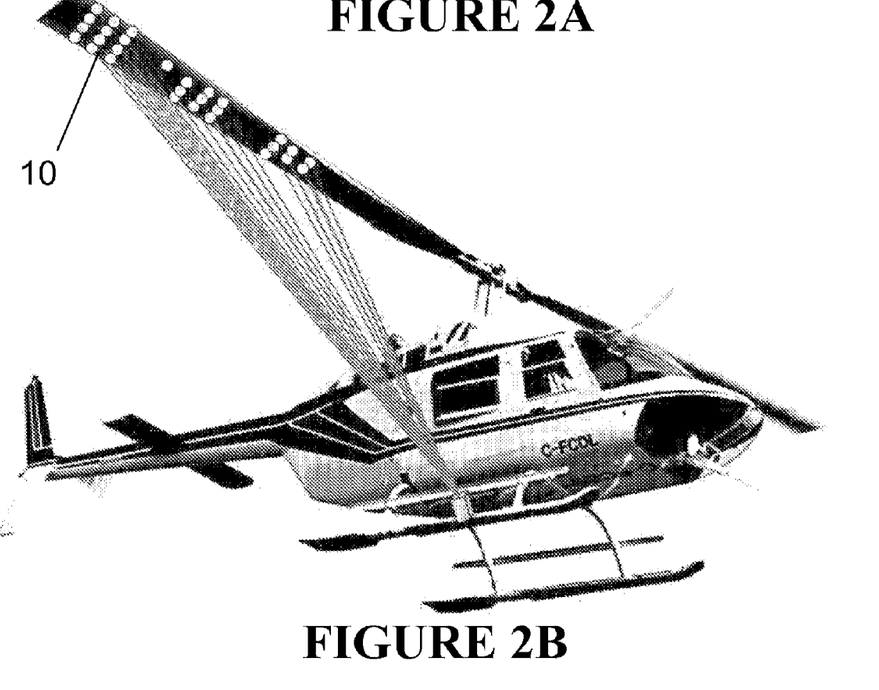
FIG. 2B is an illustration of a helicopter utilizing the system of the present invention to project laser, lines shown as a still image, or "freeze frame."

Although only a single system 1 is depicted on the helicopter in FIGS. 1 and 2A, and 2B, multiple assemblies could be positioned at various locations on the helicopter skid landing gear or fuselage, depending on the type of aircraft and application. The system of the present invention can be mounted on an aircraft in such a manner (for example on the upper surface thereof) so as to be capable of projecting, two images upon the blades, as depicted in FIG. 2A. Alternatively, a plurality of systems of the present invention can be mounted on a single aircraft in separate locations thereon, such that images can be projected onto differing areas of the rotating blades thereof. There is no limitation to the number of systems, or location of mountings thereof, of the present invention, as long as the systems are capable of projecting images upon rotating blades without obstacle.

Figure 13:
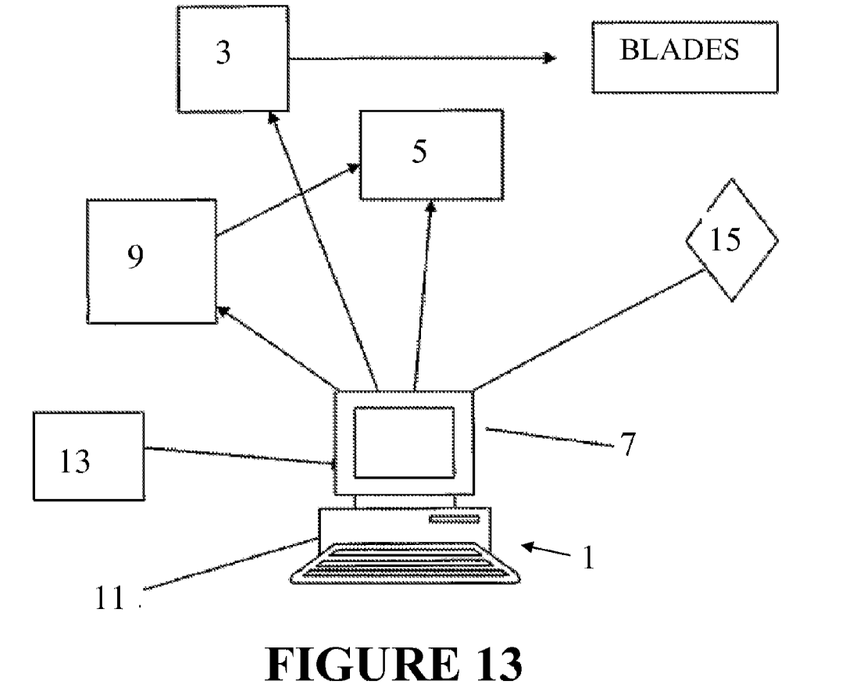
FIG. 13 is a box diagram illustrating the interrelationship of the components constituting the system of the present invention.

As to the embodiment illustrated graphically in FIG. 13, the light from the light source 3 may be redirected by one or more motion controlled mirrors 5. Or the light source may comprise a moveable light source (or sources) which directly illuminates the rotor blades 10. In a preferred embodiment, the controller 7 is operable to pulse the light source 3 in sync with blade, rotation, so as to cause the laser light to only be emitted from the light source 3 at intervals timed so as to cause the light to fall only upon rotating blades 10 (and not be projected into open air or other objects beyond the blades).

In one embodiment, the controller 7 is operable to control the movement of the one or more motion controlled mirrors 5 by mechanical manipulation thereof. In such a case, the motion-controlled mirrors may be attached to electromechanical actuators, which are in turn in communication with the controller 7. One motion controlled mirror can be utilized to reflect the light to desired positions. However, as illustrated graphically in FIG. 4, two or more motion-controlled mirrors can be used, which enable quicker scanning of the laser light across the blades. Control of two motion-controlled mirrors may be easier than one motion-controlled mirror, when attempting to reflect the light in two coordinate directions, e.g., radially and angularly.

The components utilized in conjunction with the present invention may be pre-existing hardware or software. For example, a product known as a CatWeazle II® XY feedback-style, 30K ILDA® Scan Head with a 10-200 mW green YAG laser, with optical angle of 40 degrees maximum may be used. The scanning speed specification is 30,000 pts/sec ILDA at 7 degrees optical. This particular device has scanner drivers and blanking electronics as built-in features. The CatWeazle scan engine is a intended for red diode lasers, new doubled YAG's, and ion lasers up to 10 Watts and can be used for graphics, beam launches, and fiber-remote projectors. The CatWeazle scan engine has a scan-angle of 40 degrees with performance for mid-speed scanning up to 18,000 pps. The compact driver layout for two channels XY requires that the user only supply the X and Y signals and voltage source. This exemplar device can serve as the light source of the system of the present invention, as it has the ability to produce various icons and words at an update rate that would support projection onto helicopter blades rotating on the order of several revolutions per second.

Figure 5:
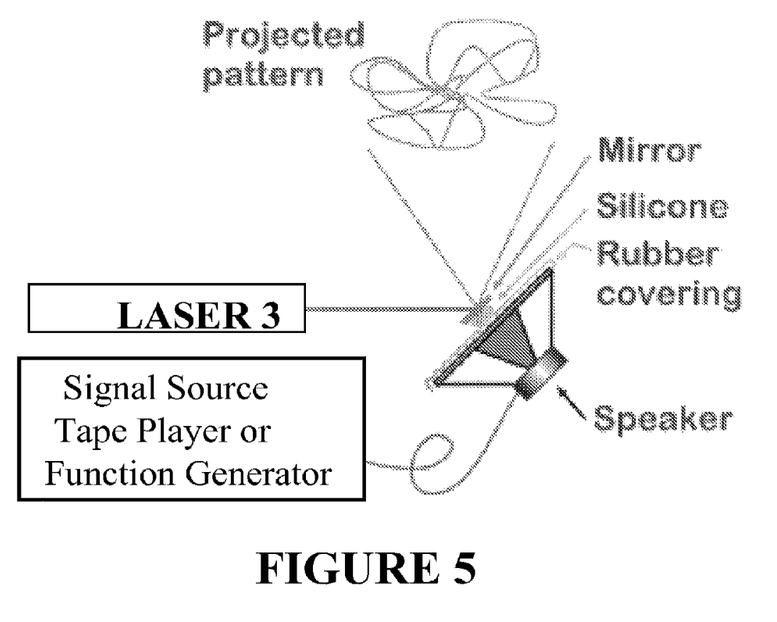
FIG. 5 is a side view of a conventional laser based sound resonance display.
Figure 6:
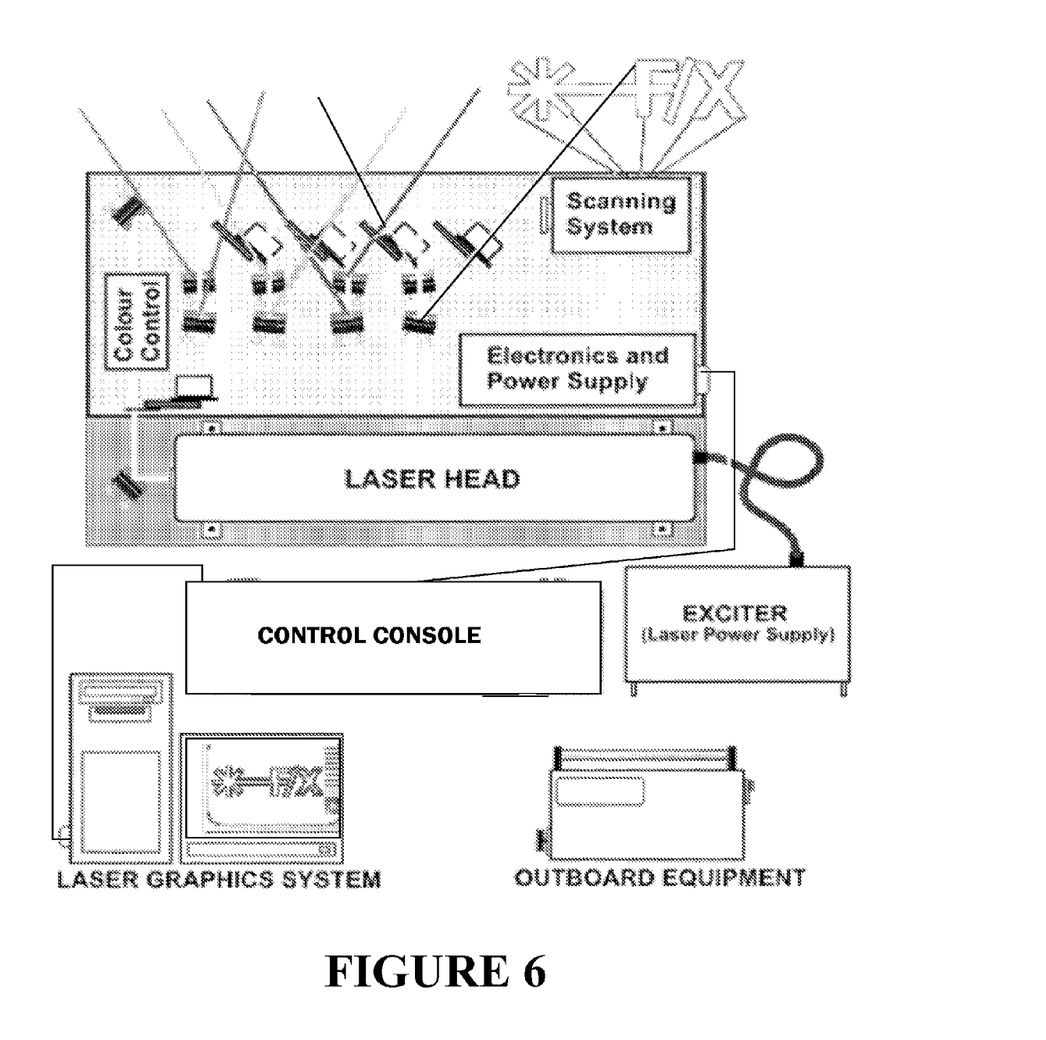
FIG. 6 is a block diagram of a conventional laser light show system.

Although a laser light source is utilized in the embodiments discussed in the foregoing, other light sources may be utilized, such as high intensity lights, halogen, spotlights, etc. Moreover, the light source 3 may comprise an array of lasers. In an embodiment of the present invention, the laser light source can be modulated and/or directed in various ways other than through the use of motion controlled mirrors in communication with electromechanical actuators. For example, as illustrated in FIG. 5, a mirror can be disposed on a speaker or the like; and the motions of the speaker can be used to control the reflected location of the laser light source. However, such an embodiment is generally only useful for creating decorative images.

In order to project images on the blades, technology similar to DLP technology, used in projectors in home theaters or conference rooms, may be utilized, along with multiple mirrors and multiple light sources. A Digital Light Processing (DLP) projection chip is a sophisticated light switch that contains an array of ~2 million hinge, mounted microscopic mirrors; a micro-array of controllable mirrors and a bright-source to illuminate all the mirrors. Each mirror is modulated to project a color or nothing at all. In intense light, or laser(s) with, divergent lens(es) on can spread the beam(s) out to hit this array, and the array elements can be individually pulsed to illuminate the appropriate blade locations at the correct time. Standard video could be the input to the controller, which manipulates the DLP projection.

Figure 4:
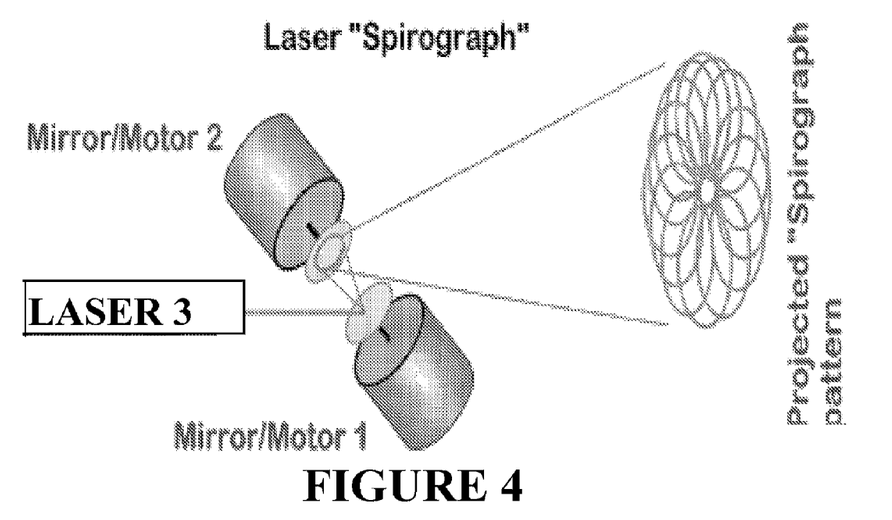
FIG. 4 is a partial perspective view of a portion of the system of the present invention (not mounted on a vehicle), wherein laser light emitted from a laser light source is reflected by motion controlled mirrors so as to project a laser spirograph. In such representative example, the system has a two-mirror construction utilizing one laser light source and two motors or actuators to control the relative position of each mirror; thereby controlling the relative X-Y position of the projected beam.

The light sources 3, as illustrated in FIG. 4, may be comprised of any conventional laser light source, such as a visible laser, an IR laser, etc. Various color laser sources can be used as the laser light source 3, including infrared lasers. The light source 3 may be capable of emitting laser light viewable with the unaided eye. For example, as illustrated in the simplified laser line chart shown below, laser light within the visible range of 350 nm to 800 nm can be emitted.

Simplified Laser Line Chart

| Color | Wavelength | |
| --- | --- | --- |
| Near Infrared | 800 nm | (Material) |
| Red | 647.1 nm | (Kr) |
| Red | 632.5 nm | (HeNe) |
| Gold | 578.2 nm | (CV) |
| Lime Green | 532 nm | (YAG) |
| Green | 528 nm | (Ar) |
| Green | 514.5 nm | (Ar) |
| Emerald Green | 510.6 nm | (CV) |
| Light Blue | 488 nm | (Ar) |
| Blue | 476.4 nm | (Ar) |
| Violet | 457.9 nm | (Ar) |

Alternatively, the system of the present invention may comprise a light source capable of emitting light-outside of the visible range. In such an embodiment, to view the projected image, a particular kind of viewing device is needed, such as a thermal imager, image intensifier, binoculars or visible camera with some form of filtering device (or filter material used in conjunction with the observer's eyes).

The controller 7 is in communication with at least one electromechanical actuator 9. Further, each motion-controlled mirror assembly 5 is operatively connected to electromechanical actuator 9 utilized to control the movement of the mirror(s) 5. The controller 7 may be further comprised of a programmable CPU (computer processing unit) 11, operatively connected to each of the electromechanical actuators 9. A power source 13, graphically illustrated in FIG. 13, may be used to power the system.

Figure 11:
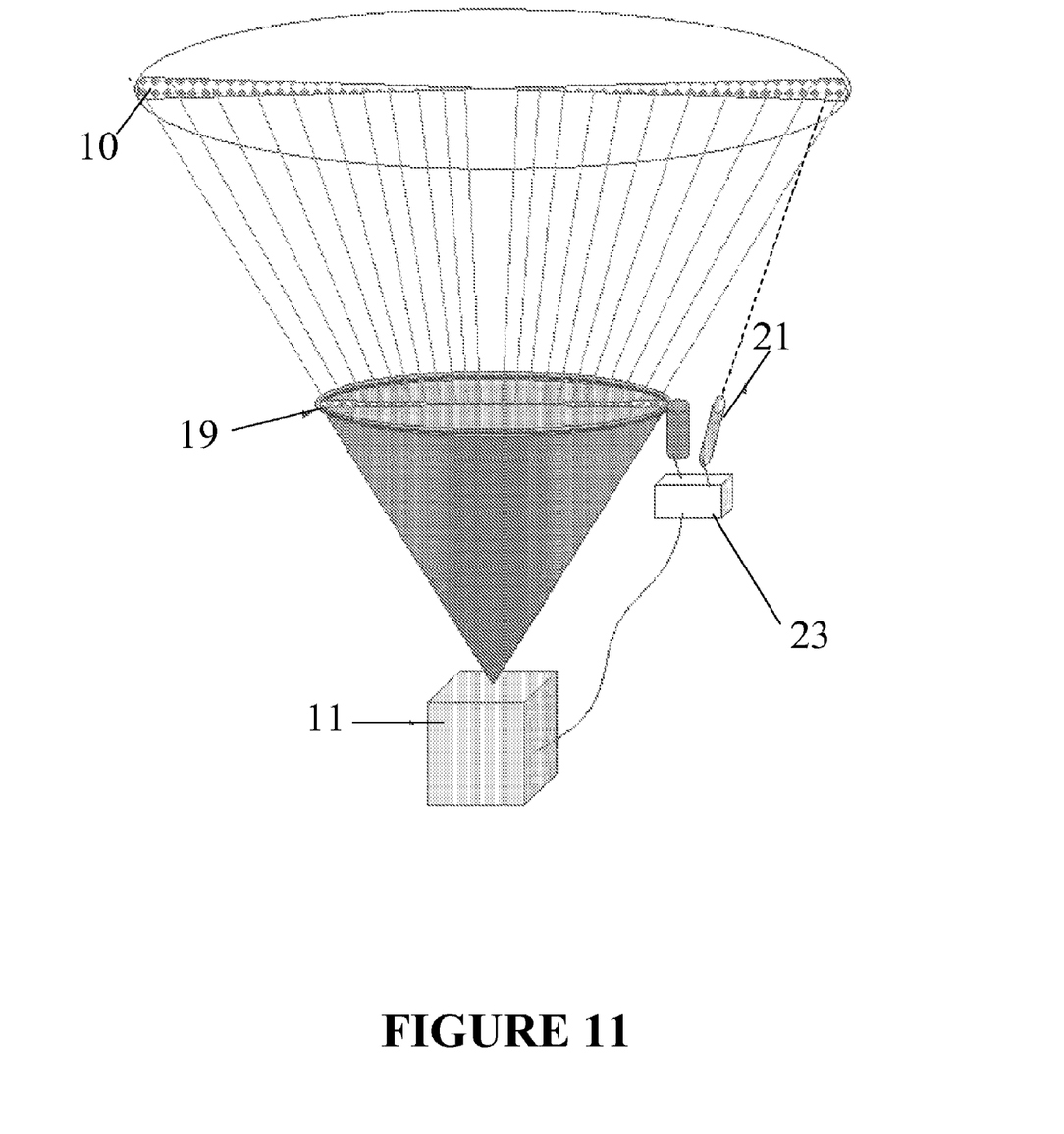
FIG. 11 is a perspective view of a mechanical shutter system of the present invention, which is synced to a rotor blade by the passive blade position sensor. The mechanical shutter acts to restrict emission of the laser light past the mechanical shutter, so as to ensure laser lines fall only onto the rotating blades.

The controller 7 is operatively connected to a sensor 15 capable of determining blade position and, optionally, predicting future blade positions. The sensor 15 is preferredly comprised of a passive infrared sensor, acoustic sensor; ultrasonic sensor, magnetic sensor, RF sensor, or electrical field sensor. In one preferred, embodiment, the sensor 15 includes directional passive IR sensors, which can sense the passing of the blade through the sensing area of the sensor due to the heat signature produced by the rotating blade. The directional passive IR sensor transmits data concerning the blade location to the controller 7, by sending a useable electronic indication readable by the CPU 11 to the controller 7 every time the thermal signature of a blade passes within the directional passive IR sensor's field of view. The passive infrared sensor converts the detected blade heat into an electrical signal for each blade pass, each electrical signal being communicated to the CPU 11 and/or controller 7. The CPU 11 and/or controller 7, upon receiving this data, calculates, the proper time to pulse the laser emission. The CPU 11 then pulses the laser light source 3 on and off at times appropriate to only emit laser light upon the blade surfaces, or optionally, controls a mechanical blanking means 17, as shown in FIG. 11, so as to restrict emission of laser light to the appropriate time intervals.

Alternatively, acoustic and/or flow sensors may be used to detect the position of the rotors blades 10, the acoustic and/or flow sensors being operable to sense the passing of each helicopter blade over a corresponding sensing area, so as to ensure a proper phased relationship between blade position and laser light emissions. To assist in the detection of passing blades by the sensors, one or more retro-reflectors may be disposed on one or more of the helicopter blades. These retro-reflectors are capable of reflecting back laser light energy for detection by electro-optical, radar, acoustic, or electromagnetic means.

Alternatively, the sensor 15 may be operatively connected to the helicopters rotor shaft, transmission or drive train (both not illustrated), so as to be capable of determining blade position based on the rotation of the rotor shaft, transmission or drive train. For example, the sensor 15 may be used to detect the position of a transmission gear, send data concerning same to the CPU 11, and the CPU 11 then calculates, blade position relative to the laser light source 3 based on an algorithm that correlates the position of a shaft or transmission gear to the blade position, and blade position relative to laser light source. The sensors may include encoders, resolvers and/or hall-effect transducers.

In a further embodiment, the sensor 15 is in indirect communication with the rotor shaft, drive train or transmission via an optical, magnetic, acoustic or RF means. For example, the sensor can be a magnetic sensor which functions to, detect movement of transmission components by detecting disturbances in the magnetic field due caused by the rotation of a predetermined ferroelectric transmission component in close proximity to the sensor, which can be correlated to blade position. An embodiment the system of the present invention utilizing such a sensor functions essentially as the above embodiment, albeit without a mechanical connection to the transmission.

The controller 7 and/or CPU 11 is capable of accurately determining the timing of the laser light emission, so that the laser light strikes only the underside of the rotating helicopter blades. To enhance the detection of the blades by the sensors, one or more retro-reflectors, may be disposed on one or more of the helicopter blades. These retro-reflectors are capable of reflecting back laser light energy for detection by electro-optical, radar, acoustic, or electromagnetic means.

As discussed above, sensors capable of detecting blade position, which may form components of the controller 7, are used to enable the CPU 11 of the controller 7 to determine the exact time that laser light should be emitted to fall only upon the blades. Then, the CPU 11 operates to control (pulse) the laser light source 3 so as to ensure that laser or light energy is emitted only contacts the blades as they rotate, and that the projected pattern is timed so that no laser energy is projected into free space between the blade positions.

In an alternative embodiment to pulsing of the laser light source, a mechanical blanking or shuttering apparatus 19, as illustrated in FIG. 11, can be utilized to prevent laser light from being emitted into the open air between the rotating blades. In such an embodiment, the mechanical blanking apparatus 19 is disposed adjacent to the laser light source 3, and is operable to disrupt the transmission of laser energy from laser light source 3 when the regions corresponding to the regions between blades where laser light should not penetrate are directly in line with the laser light source (to prevent laser light from being projected into the air beyond the rotor blades).

In a preferred embodiment, a synchronizing device 17, as shown graphically in FIG. 3, is disposed in communication with the controller 7. The synchronizing device may comprise or be operatively connected to a mechanical blanking apparatus so as to ensure the mechanical blanking apparatus is in proper phase with blade rate, thus ensuring that the laser light emissions are properly timed to be emitted only upon the helicopter blade(s) 10.

In particular, the synchronizing device 17 may be operatively connected to the controller 7, and optionally in communication with a sensor 15. The synchronizing device 17 operates to synchronize the helicopter blades 10 with, the emission or transmission of light from the light source 3.

In an alternative embodiment of the present invention, as illustrated in FIG. 11, the laser light emission may be pulsed using mechanical blanking apparatus, i.e., the laser light emission may be blocked at times in which the laser light will be emitted into the open air between the rotating blades. In such an alternative embodiment, the sensor 23, in communication with the controller 7, is also in communication with a mechanical blanking apparatus 19, which is synchronized to the rotor blades by the passive blade position sensor 21 and the shutter control and alignment mechanism 23. This mechanical shutter system substantially prevents any laser energy from penetrating the shutter aperture that would not be spatially synced to the blades by mechanically blocking laser light emission at any time other than when the rotating blades are in phase with the laser light emission.

The synchronizing mechanism of the present invention can include any type of sensor that observes blade position, such as an infrared imager that can distinguish the blade edge(s) from its background. Alternatively, a sensor, encoder or resolver can be attached at some point to the helicopter's rotor-shaft, transmission, or drive train, as discussed above.

Figure 8:
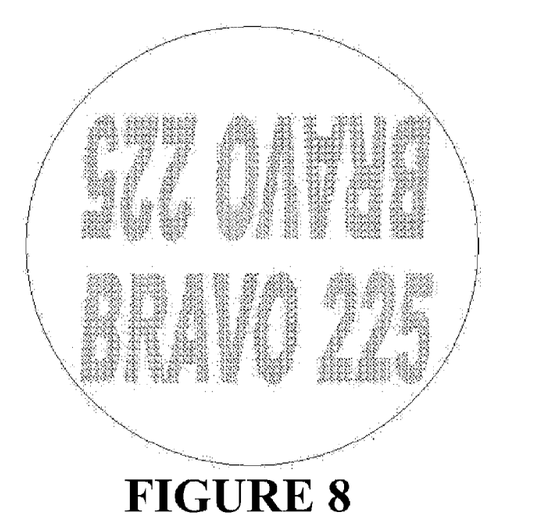
FIG. 8 is a view from the ground of a message displayed on available blade area of a helicopter using the system of the present invention, with two reversed viewing directions that would result from at least one projection system, but could also be produced by at least two systems projecting on opposite sides of the helicopter.
Figure 12:
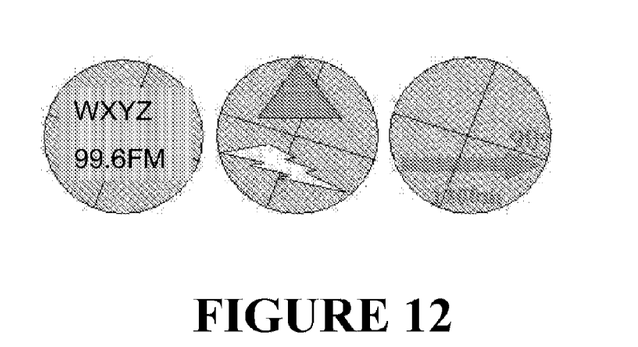
FIG. 12 is an illustration of three examples of words, symbols, and directional indicator icons that may be projected onto the underside of helicopter blades using the system of the present invention, to provide useful information to those viewing the symbolism.

With; regards to, the types of images projected by the system of the present invention, as illustrated in, inter alia, FIG. 4, decorative light patterns, such as spirographs, can be projected. In military applications, the system of the present invention can be provided which is capable of projecting a readable direction indicator to personnel below, so that the ground-based personnel can look up at the helicopter; determine their present location, and re-orient themselves with ease. As illustrated in FIG. 12(c), icons can be projected onto the underside of the helicopter, blades to instruct soldiers on the ground without the benefit of radio equipment as to which direction to go, or as illustrated in FIGS. 2 and 8, command information, such as "BRAVO," indicating an extraction point can be projected. Further, as illustrated in FIG. 12(*b*), icons representing coded communications can be displayed.

In an alternative embodiment of the present invention, the CPU 11 and for the controller 7 of the present invention is provided in communication with the aircrafts' navigation and guidance system. In such an embodiment, the helicopters' navigation and guidance system periodically or continually provides such navigation and guidance data updates to the CPU 11 of the controller 7 concerning relevant data, such as rotor position, speed, hearing, environment, and visibility limitations. Alternatively, the navigation and guidance system of the helicopter may communicate the location and orientation (roll, pitch, yawl, azimuth) (i.e., position data) of the helicopter to the CPU 11 and/or controller 7. The CPU 11 and/or controller 7 then receives the position data, compares the position data to the intended viewing location of the projected image and the message (object) of the projected image, and calculates how the projected image should be altered to be consistent with the desired objective of the projected image. Utilizing data the CPU 11 and/or controller 7 is operable to continually alter the image, via the laser light source 3 and/or the mirror 5, projected onto the underside of the rotorcraft's blades. Thus, as the helicopter is in flight, the system of the present invention can continuously project an updated situational report, which takes into account the location and disposition of the aircraft in relation to the desired objective (such as extraction point, desired, direction of travel of ground personnel, etc). These projected images could further be encrypted by the controller 7 and/or CPU 11 with symbols or codes to prevent the enemy from utilizing the same information.

In a preferred embodiment, the imagery displayed upon the aircraft or helicopter's blades may be based open a specific ground location. Or orientation, requiring that the imagery be updated during the maneuvering of the helicopter. In this embodiment, data, from the navigation and control system of the helicopter is inputted into the controller or computer which controls the image displayed on the aircraft's blades. Thus, if the helicopter is displaying an image of an arrow for directing persons on the ground below to go in a northerly direction, as the helicopter maneuvers, the image data is updated to reflect the changing orientation of the helicopter and the arrow displayed by the image continues to point in the same northerly direction. The image projected under the blades (for example, a pointing vector and range-to-target value) is modified based on being synchronized to the helicopter's GPS/INS, and the projected imagery is updated so that as the body of the aircraft rotates and/or translates, the image underneath is adjusted to display an updated bitmap representing the new relative position and/or orientation. For example, if the aircraft is leading soldiers on the ground to a rendezvous point or to the enemy/target; as the helicopter turns or maneuvers, the target point does not change but the bitmap image under the blades must be adjusted accordingly to provide continuous updates that are fed by the helicopter's navigation system.

The imaging system's connectivity with the platform's navigational system may be accomplished in a variety of ways known to those of ordinary skill in the art. One way would be to include the navigation system input as part of the aircraft's blade sensor system to determine blade position relative to the aircraft body and geospatially with respect to the earth.

The system of the present invention can also be utilized to identify friend or foe aircraft, by continuously projecting a pattern/color/symbol or identification, or by doing so only when queried. The ability to instantly change the pattern or color is very useful in a tactical environment, and automated target recognition software can be utilized by the controller 7 and/or CPU 11 added benefit.

In addition to such military applications, the system of the present invention can be utilized to convey guidance or propaganda in the local indigenous personnel's own language to relay a particular message. For example, messages such as "curfew in effect", "surrender" or "medical help," could be projected. In a preferred embodiment, the controller 7 and/or CPU 11 of the system can be in communication with a language translation methodology (such as a translation computer software program), thereby enabling a user to input a desired word or phrase; and have the controller 7 translate and project that desired word of phrase in the local language onto the underside of the helicopter blades.

Further, the system of the present invention can be utilized in advertising in a civilian environment. For example, as illustrated in FIG. 12(*a*), radio station logos or call signs can be projected onto the blades to encourage vehicles below to turn to that particular radio station for an instantaneous traffic report. Or, as illustrated in FIG. 12(*b*), weather warnings, such as lightning warnings, can be given directly to the observers below.

In another embodiment of the present invention, non-human related reception of the projected patterns could be utilized. For example, during an automated landing approach of an unmanned-aerial vehicle (UAV) or an aircraft, landing on an aircraft carrier runway or other platform, the system of the present invention may project images onto the underside of the helicopter blade readable by ground-based imaging sensors. The images may contain information such as approach vectors containing bearings, attitude, speed, etc., and may initiate feedback based on the orientation, values, position in the field of view, etc. Then, the size, orientation, and location of the projected imagery is interpreted by the ground-based sensors to determine the range, bearing, and orientation of the UAV or aircraft. The system of the present, invention may be used with other vehicles or marine vessels to project images and/or information.

In the case of a rescue helicopter, for example, instructions to a person floating in the water below can be projected onto the rotating blades, such as "wait," "put vest on," "grab rope," "secure harness," etc. With the helicopter noise, water spray, and general commotion/panic of the situation, speaker projection systems are not able to produce sufficient signal to noise ratios to overcome the helicopter and surf noise.

By pulsing the laser only at times that are pre-calculated to land directly on one particular section of a rotating blade at the proper time, and not missing the blades, saves energy by reducing the duty-factor of the laser and reduces the detectability of the aircraft from satellites or other aircraft above. A revolving block-out zone (synced to the blade rate) is programmed to ensure that laser pulses only fall on the blades. This is also important from an eye-safe laser point of view, in an effort to prevent any pass-through laser pulses to potentially hit another aircraft in the vicinity.

If higher-power (non-eyesafe) lasers are required to get the intensity/brightness needed for daytime visibility, they can be pointing upward away from ground observers, and will use the blade absorption/dispersion to dissipate the laser energy to the point it becomes eye-safe for indirect viewers. The associated dispersion resulting from projecting onto the helicopter surface or other solid surface of a vessel should eliminate the concern about collimated non-eyesafe laser sources damaging eyes or optics.

Figure 7:
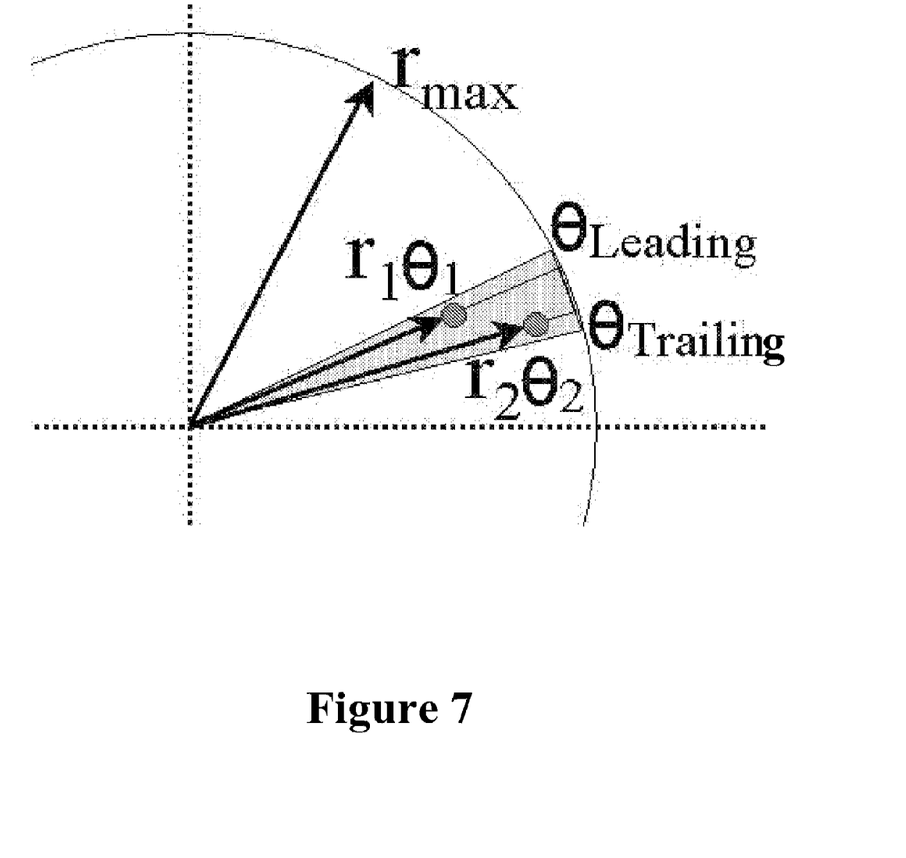
FIG. 7 is a coordinate graph, illustrating the radial and angular definitions for two points projected between the leading and trailing edges of a helicopter blade using the system of the present invention, with a main rotor max length of $r_{max}$.

Any word, symbol, number, or graphic can be represented as a function of time vs polar coordinates. As illustrated in FIG. 7, the polar coordinate designation for two points on the helicopter blade at one instant in time can be calculated. Because the blade is spinning in a polar coordinate system, this is an easy way to explain the time-varying position of the composite characters. Motion-controllers may prefer a Cartesian coordinate system, but either or both systems can be used in conjunction with the present invention.

Characters being projected by the system of the present invention can be continuous contours, or an easier implementation would be produced, with laser pulses that form characters similar to a "dot-matrix" printer. For helicopters that maintain a constant rotor RPM, the controller or CPU of the system of the present invention is able to easily predict the location of the next blade instance for projecting the next incremental sequence of points that sequentially form a character. Each successive position of the blade will receive the next appropriate sequence of dots to synthetically form a complete image that is updated numerous times per second as the blade spins through a section. Each geostationary-referenced blade section may be updated at the rate of the spinning blade.

As illustrated in FIG. 8, a message viewable from different directions below the helicopter can be created by the system herein. In particular, as shown in FIG. 8, a cryptic message for a rendezvous plan and location, such as "BRAVO 225" could be projected onto both sides of the helicopter. The circle shows the maximum possible surface area of the spinning blade, and is used to produce large letters for better distance viewing. This message partitioned into non-overlapping sections that can be sequentially projected onto the underside of the helicopter blade.

Figure 9:
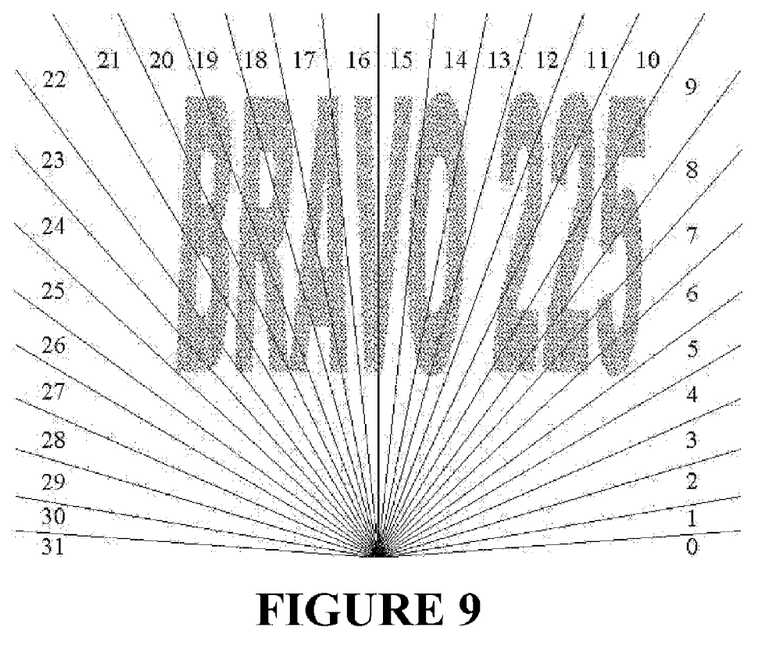
FIG. 9 is a compiled view of thirty-one non-overlapping blade images projected onto the undersides of rotating helicopter blades using the system of the present invention, to form the composite message "BRAVO 225".
Figure 10:
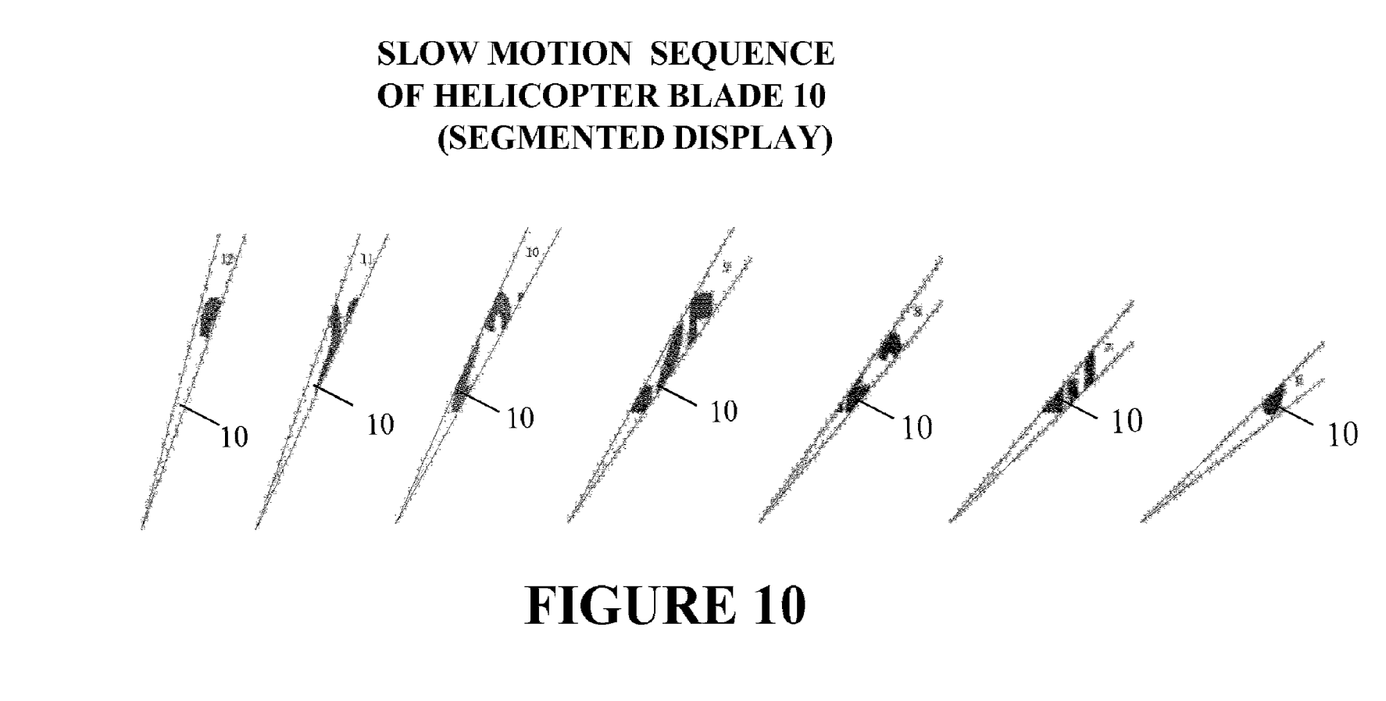
FIG. 10 is a sequential view of seven blade sections (numbers 6-12, as seen in FIG. 9) having laser lights projected thereon using the system of the present invention, illustrating non-overlapping composites that, when sequentially projected onto the rotating helicopter blades at adjacent, angular positions, will form the number "225".

As illustrated in FIG. 9, a message may be formed from thirty-one non-overlapping blade images, together forming the composite "BRAVO 225". The individual blade projected sections that form the "225" are shown in time sequence in FIG. 10. Taken individually, the dots in each angular segment represent an array of many radial and angular position pairs that are near-simultaneously projected to the proper coordinates at the instant the blade is at that particular location. Specifically, these seven blade sections, as shown in FIG. 10, show non-overlapping composites that when sequentially projected onto the moving blade at adjacent angular positions, will form the number "225".

To achieve the effect shown in FIG. 9, the CPU 11 or controller 7 may operate a motion-controlled mirror to reflect the laser light onto one blade width interval, i.e., an area such as "7" shown in FIG. 9. The motion-controlled mirrors operate to scan, at a very rapid rate, the laser energy of the laser light source over a large portion of the blade segment. During this scanning movement of the motion-controlled mirrors, the CPU continuously calculates the exact time and position that the laser energy should be emitted from the laser light source to correspond with a predetermined portion of the pattern to be projected upon the blade. By determining the exact time and position of the laser light emission, the CPU 11 and/or controller 7 calculates when the laser light should be emitted. The CPU 11 and/or controller 7 signals the laser light source on and off at the appropriate time intervals for that particular blade position and pattern portion corresponding thereto. For example, in blade interval "22" in FIG. 9, when scanning that blade interval, the laser light source 3 is powered off when scanning outwards from the center of rotation. When the projected angle corresponds to the lower left leg of the letter "R", the light source 3 is powered on. When the projected angle of the light source corresponds to the space between "R" and "B", the laser light source is powered off. Subsequently, when the projected angle of the light source corresponds to lower right portion of "B", the laser light source is powered back on, powered off when the projected angle corresponds to the lower void in "B", powered on when the angle corresponds to left vertical portion of "B", and finally powered off when the angle corresponds to the blade area beyond the letter "B" in blade interval "22". The above process is performed by the system of the present invention for each blade interval (numerically identified as "0" to "31" in FIG. 9). Alternatively, an array of lasers May be utilized to illuminate various radial portions of the blade 10 simultaneously.

Preferably, the process described above may be utilized to project laser light, upon the blade in a continuous fashion during rotation. In such an embodiment, the available surface area of the blade to be projected upon is maximized (as you are projecting the image on the blade continuously by controlling the laser light to follow the blade during rotation), and the fidelity of the image is improved (more, light, more detail).

In a preferred embodiment, the CPU 11 and/or controller 7 is programmable to control the motion-controlled mirrors to only scan the blade intervals in the areas adjacent to the areas of the blades to be illuminated. In so doing, the system intelligently limits area covered by the scanning process to maximize the dwell time of the illuminated image portion. Specifically, the controller 7 may be programmed to only scan the blades in the area adjacent the projected image, which maximizes the time the blades are illuminated, and decreases the overall time needed to illuminate the entire blade.

The system of the present invention' can be used to project an image on any rotating blade, including the rotor blades of tilt-wing aircraft, fixed wing aircraft, etc. As with the helicopter application mentioned above, the disposition of the system relative to the aircraft is not limited, so long as there is a clear path (i.e., no obstruction) the path of projection from the system to a portion of a rotating blade. Further, with tilt-wing aircraft and fixed wing aircraft, the image can be projected upon either side of the rotating blade.

Although specific embodiments of the present invention have been disclosed herein, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method for displaying information on at least one rotating aircraft blade comprising:
   sensing the location of at least one rotating aircraft blade using a sensor;
   transmitting the sensed data to a controller;
   accessing bitmapped information stored in memory;
   inputting the information stored in memory to the controller;
   processing the bitmapped information stored in memory in conjunction with the data from the sensor to create coordinate and time delay information;
   transmitting the coordinate information from the controller to a light source;

illuminating a predetermined portion or portions of a rotating aircraft blade based upon the coordinate and time delay data.

2. The method of claim 1 wherein the illuminating step comprises illuminating a source of light positioned on an aircraft.

3. The method of claim 1, wherein the controller operates to illuminate the light source at intervals based upon the time delay data.

4. The method of claim 1 wherein at least one light source is mounted on the aircraft and light is directed from the light source onto a specific location or locations on the at least one rotating aircraft blade.

5. The method of claim 4 wherein the at least one light source comprises at least one laser.

6. The method of claim 1 wherein a means for directing light is used to direct light from a light source onto the aircraft blade.

7. The method of claim 1, wherein the sensor comprises one or more of a passive infrared sensor, acoustic sensor, ultrasonic sensor, magnetic sensor, RF sensor, electrical field sensor or IR sensor.

8. The method of claim 1 wherein the graphical or image data is bitmapped and the controller transmits time delay and coordinate information based upon the blade position data from the sensor and the bitmapped graphical or image data from the memory to a light source for illuminating portions of at least one rotating blade to display the graphical or image data from the memory to a person on the ground.

9. The method of claim 8 wherein the controller is operatively connected to at least one of the aircraft's transmission, navigation and guidance systems such that the rotor position, aircraft position, orientation, and/or target information may be transmitted to the controller and the bitmapped image can be updated by the controller using data from at least one of the helicopter's position, attitude or targeting sensors.

10. The method of claim 1 wherein the sensor, controller, memory and light source are adapted to be mounted to a preexisting aircraft without modification of the aircraft blade structure.

11. A method for displaying information on at least one rotating aircraft blade comprising:
accessing bitmapped information stored in memory;
inputting the information stored in memory to a controller;
processing the bitmapped information stored in memory to create coordinate information;
transmitting the coordinate information from the controller to a light source;
illuminating a predetermined portion or portions of at least one rotating aircraft blade based upon the coordinate data.

12. The method of claim 11 wherein the location of the at least one rotating aircraft blade is determined by using a sensor, the sensor being operatively connected to the controller; the sensor operating to transmit to the controller coordinate information for the location of a portion or portions of the at least one rotating aircraft blade, the controller using the coordinate information to calculate time dependent location information for selective illumination of the at least one rotating aircraft blade at predetermined positions of the blade, the illumination being timed so that the controller sequentially displays different information for illumination of the at least one blade at different locations of the at least one blade during each cycle of the blade.

13. The method of claim 12 wherein the illuminating step comprises illuminating a source of light positioned on an aircraft such that the portion or portions of the at least one rotating aircraft blade are illuminated based upon the coordinate and time delay information sensed by the sensor device.

14. The method of claim 12, wherein the sensor comprises one or more of a passive infrared sensor, acoustic sensor, ultrasonic sensor, magnetic sensor, RF sensor, electrical field sensor, visible sensor, UV sensor, and IR sensor.

15. The method of claim 12 wherein at least one light source is mounted on the aircraft and light is directed from the light source onto a specific location or locations on the at least one rotating aircraft blade, and wherein the controller operates to illuminate the light source at intervals based upon the time delay data such that the at least rotating aircraft blade is illuminated by the light source at the time when the at least one rotating aircraft blade is located at a predetermined location.

16. The method of claim 12 wherein the bitmapped information stored in memory comprises graphical or image data containing emergency information for display to persons located in the vicinity of the aircraft and wherein the controller transmits time delay and coordinate information based upon the blade position data from the sensor and the bitmapped graphical or image data from the memory to a light source for illuminating portions of at least one rotating blade to display the graphical or image data from the memory to persons in the vicinity of the aircraft.

17. The method of claim 12 wherein the controller is operatively connected to the aircraft's transmission, navigation and guidance system such that the rotor position, aircraft position, orientation, and/or target information may be transmitted to the controller and the bitmapped image can be updated by the controller using data from at least one of the helicopter's position, attitude or targeting sensors.

18. The method of claim 11 wherein the sensor, controller, memory and light source are adapted to be mounted to a preexisting aircraft without modification of the aircraft blade structure.

19. The method of claim 11 wherein the light source comprises at least one of a laser, high-intensity light filament, and light-emitting diode.

20. The method of claim 11 wherein the light illuminates the at least one aircraft blade at precisely timed intervals and a means for directing light is used to direct light from a light source onto the aircraft blade.

* * * * *